(12) United States Patent
Iwata (10) Patent No.: US 11,228,689 B2
(45) Date of Patent: Jan. 18, 2022

(54) ROUTINE PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Masahiro Iwata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/864,271

(22) Filed: May 1, 2020

(65) Prior Publication Data

US 2021/0099589 A1 Apr. 1, 2021

(30) Foreign Application Priority Data

Oct. 1, 2019 (JP) .............................. JP2019-181397

(51) Int. Cl.
*H04N 1/00* (2006.01)
(52) U.S. Cl.
CPC ..... *H04N 1/00501* (2013.01); *H04N 1/00413* (2013.01); *H04N 1/00482* (2013.01)
(58) Field of Classification Search
CPC ........... H04N 1/00501; H04N 1/00413; H04N 1/00482
USPC ....................................................... 358/1.13
See application file for complete search history.

(56) References Cited

U.S. PATENT DOCUMENTS

| 2006/0089133 | A1* | 4/2006 | Yoshizawa | ......... H04N 1/00214 455/418 |
| 2015/0146242 | A1* | 5/2015 | Tsujimoto | ............. G06F 3/1236 358/1.15 |
| 2019/0266397 | A1* | 8/2019 | Arakawa | ............ H04N 1/00413 |
| 2019/0306343 | A1* | 10/2019 | Kado | ................. H04N 1/00413 |
| 2020/0104078 | A1* | 4/2020 | Arifuku | ................ G06F 3/1257 |

FOREIGN PATENT DOCUMENTS

| JP | 2004-112067 A | 4/2004 |
| JP | 2010-114607 A | 5/2010 |
| JP | 2017-011627 A | 1/2017 |

* cited by examiner

*Primary Examiner* — Allen H Nguyen
(74) *Attorney, Agent, or Firm* — Oliff PLC (57) ABSTRACT

A routine processing device includes a processor. In routine processing, an application parameter that defines an operation of an application and a system parameter that defines an operation of a system that is an environment where the application is executed are registered. The processor is configured to, if the system parameter at a time of the registration and a system parameter set in the system at a time when the routine processing is to be executed do not match, change the system parameter at the time of the registration in the routine processing to the system parameter set in the system at the time when the routine processing is to be executed.

8 Claims, 7 Drawing Sheets

| ROUTINE PROCESSING ID | APPLICATION PARAMETER | | SYSTEM PARAMETER | |
|---|---|---|---|---|
| | COLOR | DOCUMENT TYPE | SYSTEM SETTING ID | SYSTEM SETTING PARAMETER |
| 0001 | BLACK AND WHITE | TEXT | 123001 | FIRST AUTHENTICATION INFORMATION |
| 0002 | COLOR | PHOTOGRAPH | 123001 | FIRST AUTHENTICATION INFORMATION |
| 0003 | UNSPECIFIED | UNSPECIFIED | 123001 | SECOND AUTHENTICATION INFORMATION |

ROUTINE PROCESSING INFORMATION

| USER ID | PASSWORD |
|---|---|
| ALL USERS | UNNECESSARY |

FIRST AUTHENTICATION INFORMATION

| USER ID | PASSWORD |
|---------|----------|
| A | a1b2c3 |
| B | e4f5g6 |
| C | h7j8k9 |
|   |   |

SECOND AUTHENTICATION INFORMATION

| SYSTEM SETTING ID | SYSTEM SETTING PARAMETER | CHANGE DATE |
|-------------------|--------------------------|-------------|
| 123001 | SECOND AUTHENTICATION INFORMATION | SEPTEMBER 2, 2019 |

SYSTEM SETTING PARAMETER INFORMATION

ROUTINE PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-181397 filed Oct. 1, 2019.

BACKGROUND

1. Technical Field

The present disclosure relates to a routine processing device and a non-transitory computer readable medium.

2. Related Art

JP-A-2004-112067 discloses a parameter setting method for setting a parameter that is a reading condition when a document is read on an image reading side. The parameter setting method includes: setting the parameter on the image reading side; acquiring, from an image management device connected via a network, at least one job memory in which a parameter is set in advance; selecting a desired job memory from the acquired job memories; combining a parameter of the selected job memory and the parameter set on the image reading side; and registering the combined parameters in the image management device as a job memory.

JP-A-2017-011627 discloses an image processing device including: a storage that stores a correspondence relationship between setting information defining a setting condition of image processing and an identifier, and stores execution information defining an execution condition of the setting information; an acquiring unit that acquires an identifier embedded in a code image and execution information by photographing; and a prohibition unit that prohibits execution of the setting information associated with the identifier acquired by the acquiring unit when the execution information acquired by the acquiring unit is different from the execution information stored in the storage.

JP-A-2010-114607 discloses an image processing device including an image input unit, an image processing unit, an image output unit, an operation display unit, a program registration unit, and a controller. The image input unit inputs an image. The image processing unit processes image data generated through the input by the image input unit as output image data. The image output unit outputs an image based on the output image data. The operation display unit has a user interface function and receives an operation of an image input and output request accompanied by an input and output condition. The program registration unit associates and registers operation information related to the image input and output request received by the operation display unit and program-related information related to a program executed according to the operation information. The controller controls the entire image processing device according to the image input and output request by controlling each unit of the image processing device including the image input unit, the image processing unit, the image output unit, the operation display unit, and the program registration unit. Further, the operation display unit is a unit that can receive an operation of an image input and output request for reusing the operation information registered in the program registration unit. Further, when the controller receives, via the operation display unit, the image input and output request for reusing the operation information registered in the program registration unit, the controller confirms differences between the program-related information registered in association with the operation information and current program-related information, and if there is a difference, the controller notifies the fact and causes the operation display unit to make a notification of prompting an operation for making different program-related information identical, and if there is no difference, the controller causes the operation display unit to execute image input and output processing according to the registered program-related information.

SUMMARY

In routine processing, for example, an application parameter for defining an operation of an application that stores a file in an external server, and a system parameter for defining an operation of a system that is an environment where the above-described application is executed may be registered. When an authentication parameter, that is, one of the above-described system parameters is changed, for example, from "use a system setting" to "use device authentication information", a person who succeeds in authentication before the change and are permitted to store the file fails in authentication after the change and cannot store the file, that is, the above-described routine processing cannot be executed.

Aspects of non-limiting embodiments of the present disclosure relate to providing a routine processing device and a non-transitory computer readable medium that, even when a system parameter is changed, can execute routine processing including the system parameter that is registered before the change.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a routine processing device including a processor. In routine processing, an application parameter that defines an operation of an application and a system parameter that defines an operation of a system that is an environment where the application is executed are registered. The processor is configured to, if the system parameter at a time of the registration and a system parameter set in the system at a time when the routine processing is to be executed do not match, change the system parameter at the time of the registration in the routine processing to the system parameter set in the system at the time when the routine processing is to be executed.

BRIEF DESCRIPTION OF THE DRAWINGS

Exemplary embodiment(s) of the present disclosure will be described in detail based on the following figures, wherein.

DETAILED DESCRIPTION

Exemplary Embodiment

Hereinafter, an image processing system according to an exemplary embodiment of the invention will be described.

Configuration of Exemplary Embodiment

Figure 1:
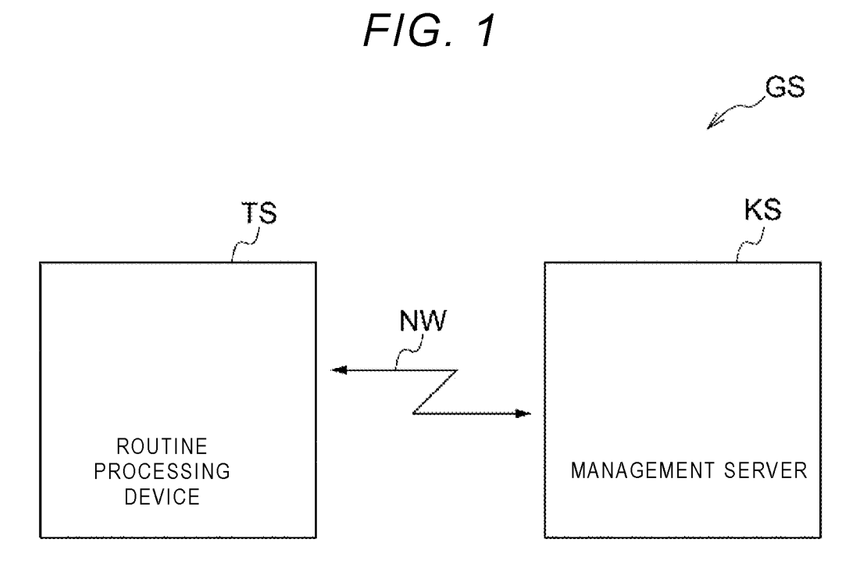
FIG. 1 shows a configuration of an image processing system according to an exemplary embodiment.

FIG. 1 shows a configuration of the image processing system according to the exemplary embodiment. Hereinafter, the configuration of the image processing system according to the exemplary embodiment will be described with reference to FIG. 1.

As shown in FIG. 1, an image processing system GS according to the exemplary embodiment executes routine processing (a content of a routine processing ID shown in FIG. 6) selected by a user. The image processing system GS includes a routine processing device TS, a management server KS, and a network NW.

Figure 2:
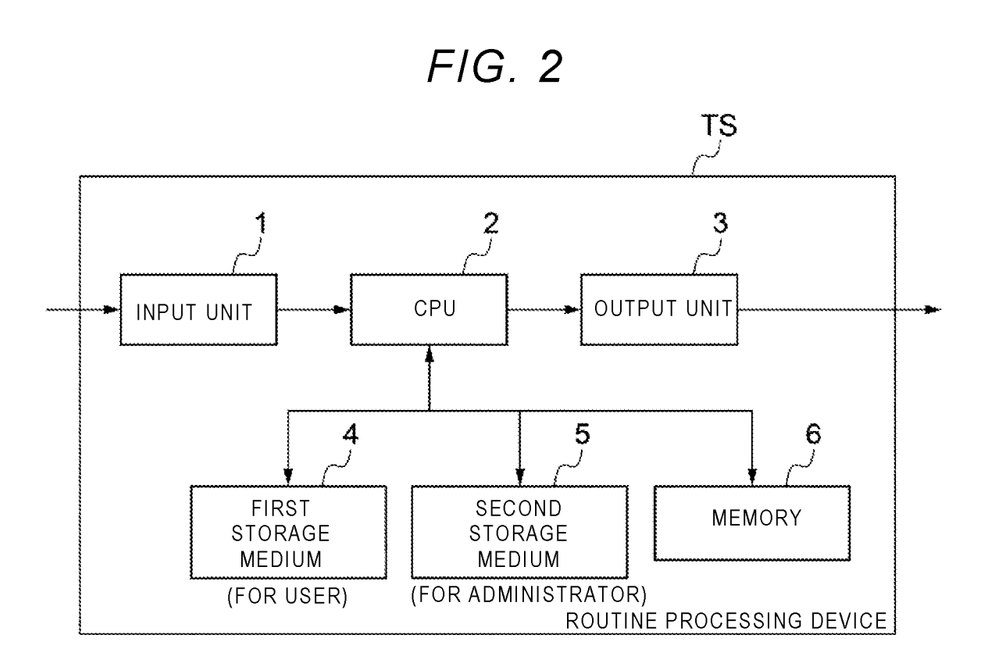
FIG. 2 shows a configuration of a routine processing device according to the exemplary embodiment.

FIG. 2 shows a configuration of the routine processing device according to the exemplary embodiment.

As shown in FIG. 2, the routine processing device TS includes an input unit 1, a central processing unit (CPU) 2, an output unit 3, a first storage medium 4, a second storage medium 5, and a memory 6.

The input unit 1 includes, for example, a keyboard, a mouse, a touch panel, a network connection unit, and a scanner. The CPU 2 is an example of a processor. The CPU 2 is a well-known core of a computer that operates hardware according to software. The output unit 3 includes, for example, a printer, a liquid crystal monitor, and a network connection unit. Each of the first storage medium 4 and the second storage medium 5 includes, for example, a hard disk drive (HDD), a solid state drive (SSD), and a read only memory (ROM). The memory 6 includes, for example, a dynamic random access memory (DRAM) and a static random access memory (SRAM). Here, the first storage medium 4 is used by a user of the image processing system GS, while the second storage medium 5 is used by an administrator of the image processing system GS.

<First Storage Medium>

Figure 3:
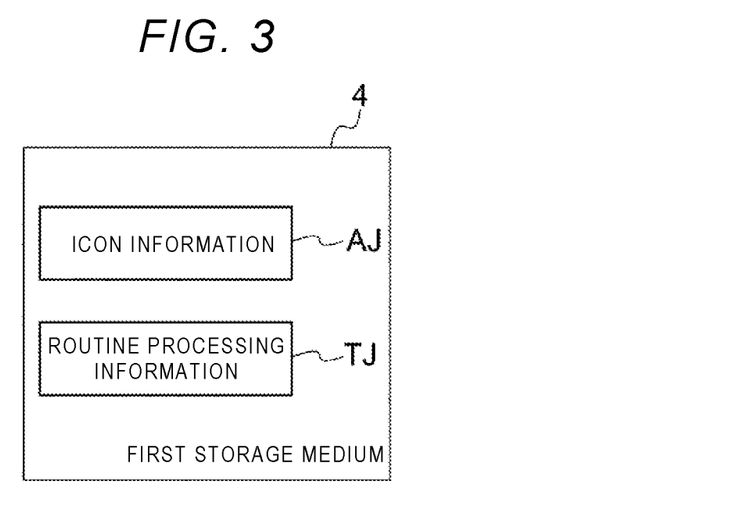
FIG. 3 shows information stored in a first storage medium according to the exemplary embodiment.

FIG. 3 shows information stored in the first storage medium according to the exemplary embodiment.

As shown in FIG. 3, the first storage medium 4 includes icon information AJ and routine processing information TJ.

Figure 4:
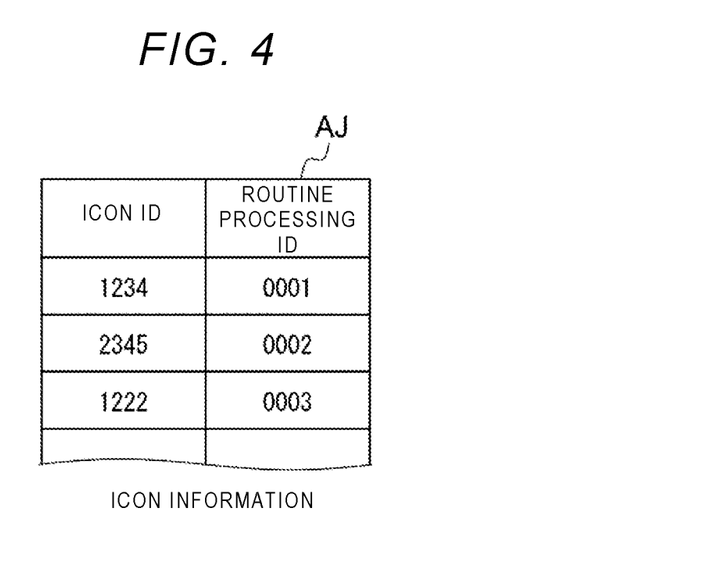
FIG. 4 shows icon information according to the exemplary embodiment.

FIG. 4 shows the icon information AJ according to the exemplary embodiment.

As shown in FIG. 4, the icon information AJ includes an icon ID and a routine processing ID.

Figure 5:
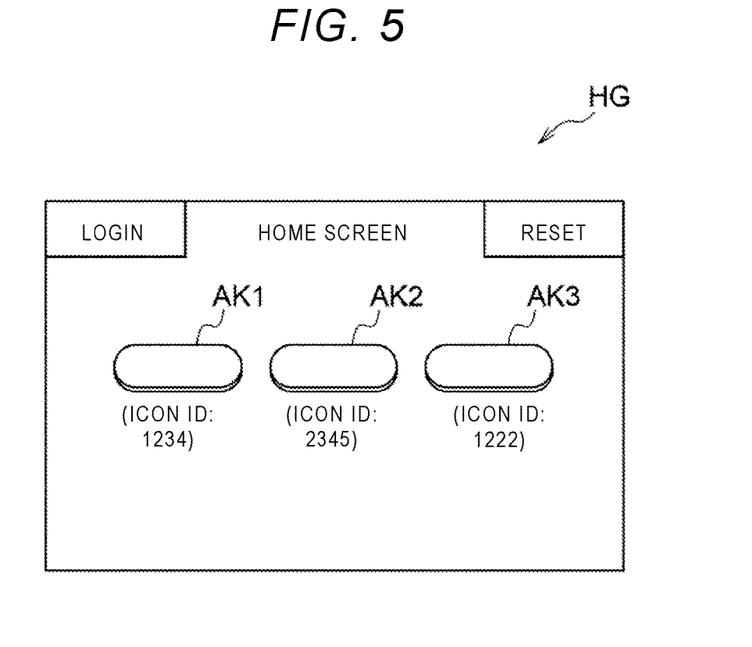
FIG. 5 shows an example of a manner in which icons according to the exemplary embodiment are displayed.

FIG. 5 shows an example of a manner in which icons according to the exemplary embodiment are displayed.

As shown in FIG. 5, in order to assist the user in operating the routine processing device TS, the routine processing device TS displays a home screen HG on the output unit 3 (shown in FIG. 2) which is, for example, the liquid crystal monitor. As shown in FIG. 5, the home screen HG includes plural icons AK1 to AK3 in addition to a login button and a reset button. As shown in FIG. 5, icon IDs are respectively assigned to the icons AK1 to AK3. As shown in FIG. 4, each of the icon IDs is assigned to a corresponding one of the routine processing IDs.

More specifically, as shown in FIGS. 4 and 5, an icon ID "1234" and a routine processing ID "0001" are assigned to the icon AK1. An icon ID "2345" and a routine processing ID "0002" are assigned to the icon AK2. An icon ID "1222" and a routine processing ID "0003" are assigned to an icon AK3.

Figure 6:
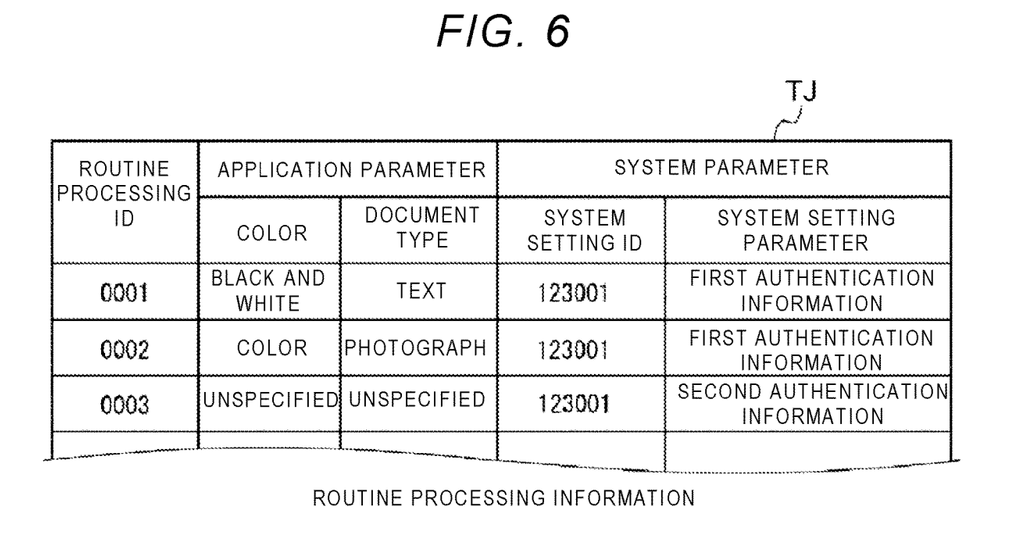
FIG. 6 shows routine processing information according to the exemplary embodiment.

FIG. 6 shows the routine processing information TJ according to the exemplary embodiment.

As shown in FIG. 6, the routine processing information TJ includes the routine processing ID, an application parameter, and a system parameter. In other words, the content of the routine processing is defined by the application parameter and the system parameter. Here, the "application" is software that executes a task that the user wants to execute in an environment of the image processing system GS. The "system" is the image processing system GS itself. The "application parameter" is a parameter that a user selects and sets in order to execute the application. The "system parameter" is a parameter that the administrator of the image processing system GS sets in order to execute image processing by the image processing system GS.

A combination of the application parameter and the system parameter in the routine processing is registered by the user. More precisely, the user always registers the application parameter in the routine processing, and registers the system parameter only when necessary. In other words, the routine processing always has the application parameter, but does not always have the system parameter.

Referring to FIGS. 4 to 6, the user registers a color "black and white" and a document type "text" as the application parameter in the routine processing ID "0001" assigned to the icon AK1, and registers a system setting parameter "first authentication information" as the system parameter in a system setting ID "123001". Similarly, the user registers a color "color" and a document type "photograph" as the application parameter in the routine processing ID "0002" assigned to the icon AK2, and registers the system setting parameter "first authentication information" as the system parameter in the system setting ID "123001".

Here, it is assumed that the system setting ID "123001" means "authentication information for accessing the management server KS" among settings related to plural systems provided in the image processing system GS. Further, it is assumed that the system setting parameter "first authentication information" means that "any person" can access the management server KS, while the system setting parameter "second authentication information" (assigned to the routine processing ID "0003") means that "only a person who has a user ID and a password for access" can access the management server KS. In summary, regarding a condition for accessing the management server KS, the "second authentication information" is stricter than the "first authentication information".

<Second Storage Medium>

Figure 7:
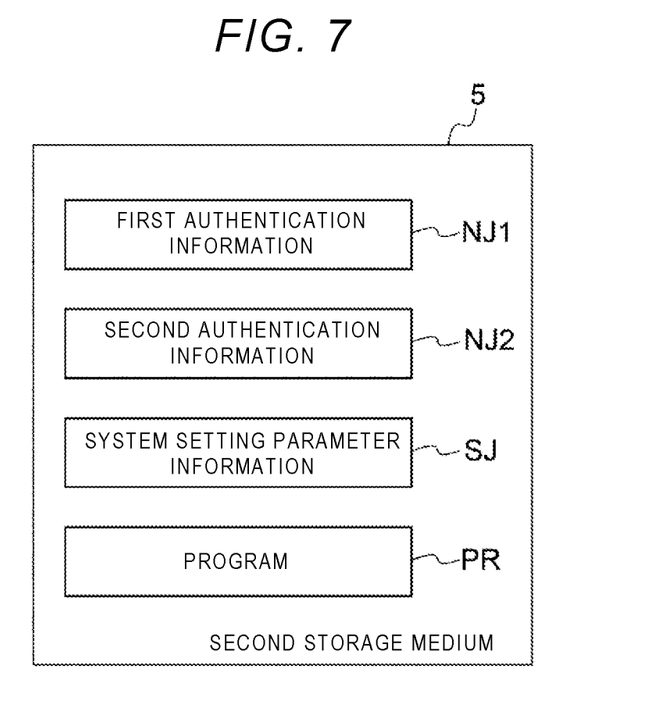
FIG. 7 shows information stored in a second storage medium according to the exemplary embodiment.

FIG. 7 shows information stored in the second storage medium according to the exemplary embodiment.

As shown in FIG. 7, the second storage medium 5 includes first authentication information NJ1, second authentication information NJ2, system setting parameter information SJ, and a program PR.

Figure 8:
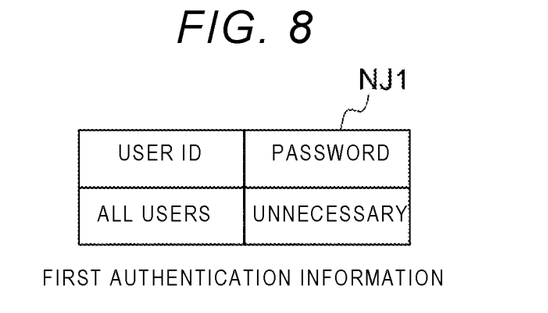
FIG. 8 shows first authentication information according to the exemplary embodiment.

FIG. 8 shows the first authentication information NJ1 according to the exemplary embodiment.

As shown in FIG. 8, the first authentication information NJ1 includes a user ID and a password. The first authentication information NJ1 is used as authentication information when a user logs in to the routine processing device TS and the management server KS. As described above, the "first authentication information" means that "any person" can access the routine processing device TS and the management server KS. Therefore, "all users" is registered in the user ID, and "unnecessary" is registered in the password. In other words, the user ID "all users" and the password "unnecessary" allows "any person" to access as described above.

Figure 9:
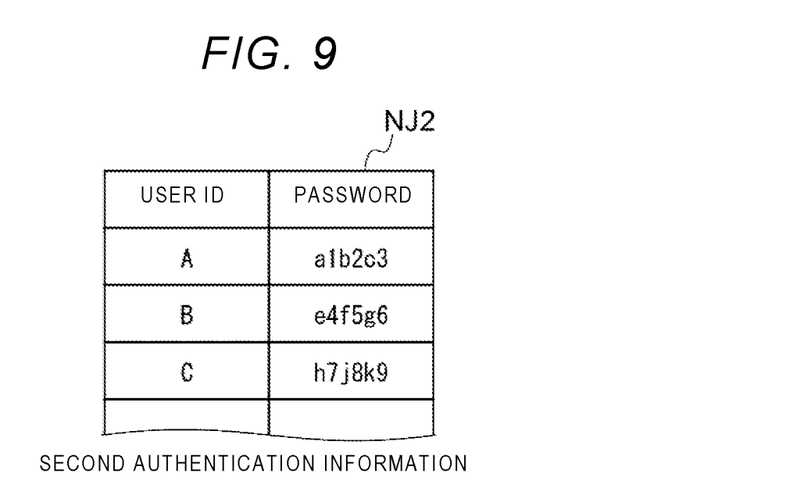
FIG. 9 shows second authentication information according to the exemplary embodiment.

FIG. 9 shows the second authentication information NJ2 according to the exemplary embodiment.

As shown in FIG. 9, the second authentication information NJ2 includes a user ID and a password, like the first authentication information NJ1 (shown in FIG. 8). The second authentication information NJ2 is used as authentication information when a user logs in to the routine processing device TS and the management server KS. As described above, the "second authentication information" means that "only a person who has an ID and a password for access" can access the routine processing device TS and the management server KS. For example, "A" is registered in the user ID, and "a1b2c3" is registered in the password. Therefore, a user "A" logs in to the routine processing device TS using the user ID "A" and the password "a1b2c3", so that the user "A" can use the routine processing device TS and the management server KS. Similarly, a user "B" as another user logs in to the routine processing device TS using a user ID "B" and a password "e4f5g6", so that the user "B" can use the routine processing device TS and the management server KS. Further, a user "C" logs in to the routine processing device TS using a user ID "C" and a password "h7j8k9", so that the user "C" can use the routine processing device TS and the management server KS.

Figure 10:
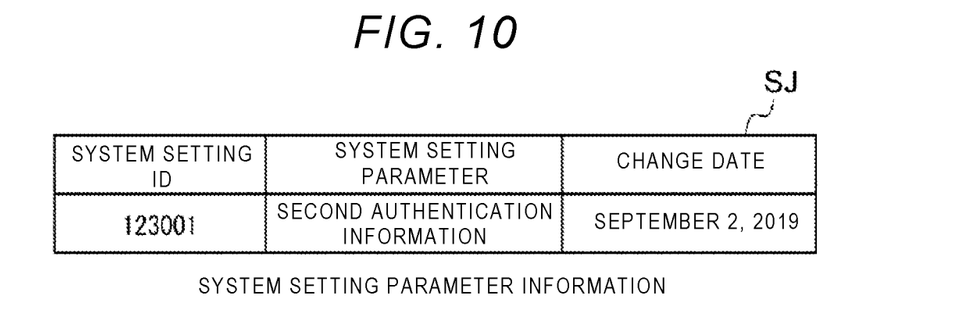
FIG. 10 shows system setting parameter information according to the exemplary embodiment.

FIG. 10 shows the system setting parameter information SJ according to the exemplary embodiment.

As shown in FIG. 10, the system setting parameter information SJ includes the system setting ID, the system setting parameter, and a change date. The system setting parameter information SJ indicates parameters for defining the settings related to the plural systems provided in the image processing system GS. As shown in FIG. 10, for example, the system setting ID "123001", the system setting parameter "second authentication information", and the change date "Sep. 2, 2019" are registered in the system setting parameter information SJ. As described above, the system setting ID "123001" means the "authentication information for accessing the management server KS", the system setting parameter "second authentication information" means that the second authentication information NJ2 (shown in FIG. 9) is used as the authentication information when the management server KS is accessed, and "Sep. 2, 2019" means that the system setting parameter "second authentication information" is changed on "Sep. 2, 2019".

Returning to FIG. 7, the program PR is an instruction group that defines contents of processing to be executed by the routine processing device TS.

Figure 11:
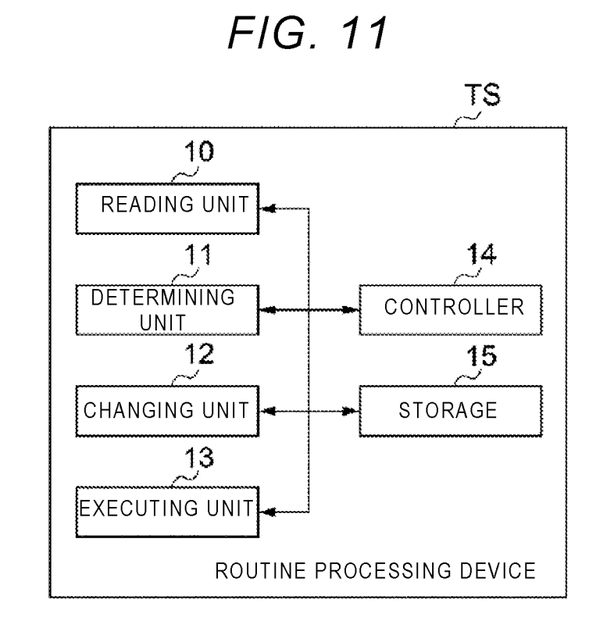
FIG. 11 is a functional block diagram of the routine processing device according to the exemplary embodiment.

FIG. 11 is a functional block diagram of the routine processing device according to the exemplary embodiment.

As shown in FIG. 11, the routine processing device TS includes a reading unit 10, a determining unit 11, a changing unit 12, an executing unit 13, a controller 14, and a storage 15.

Regarding relationships between hardware configurations (shown in FIG. 2) and functional configurations (shown in FIG. 11) in the routine processing device TS, the CPU 2 executes the program PR stored in the second storage medium 5 (that implements some functions of the storage 15) on the hardware using the memory 6 (that implements some other functions of the storage 15). If necessary, the CPU 2 serves as the controller 14 to implement functions of the reading unit 10, the determining unit 11, the changing unit 12, and the executing unit 13 by controlling operations of the input unit 1 and the output unit 3. The function of each unit will be described later.

Figure 12:
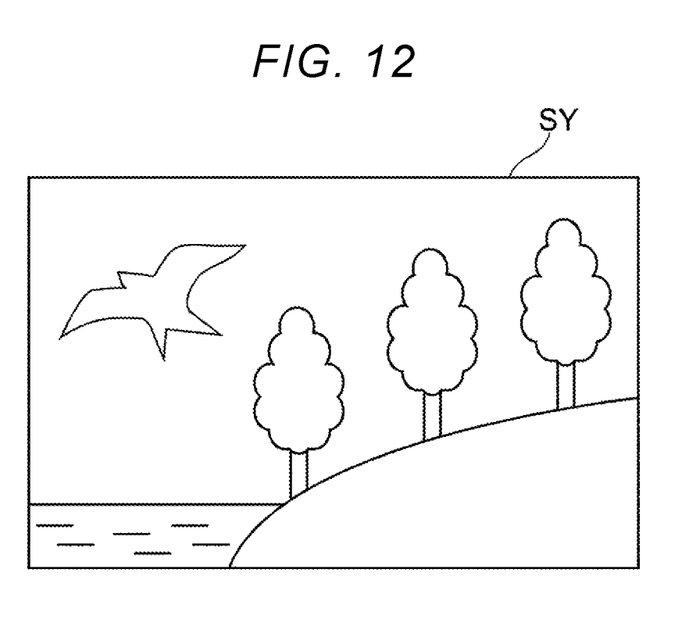
FIG. 12 shows a photograph that is an image according to the exemplary embodiment.

Returning to FIG. 1, the management server KS includes a storage medium (not shown). When the routine processing is, for example, storing an image (color photograph SY shown in FIG. 12), the management server KS stores the color photograph SY, which is received from the routine processing device TS via the network NW, in the storage medium in the management server KS.

The network NW is a known network, for example, the Internet or an intranet, or a wireless network or a wired network.

Operation of Exemplary Embodiment

Figure 13:
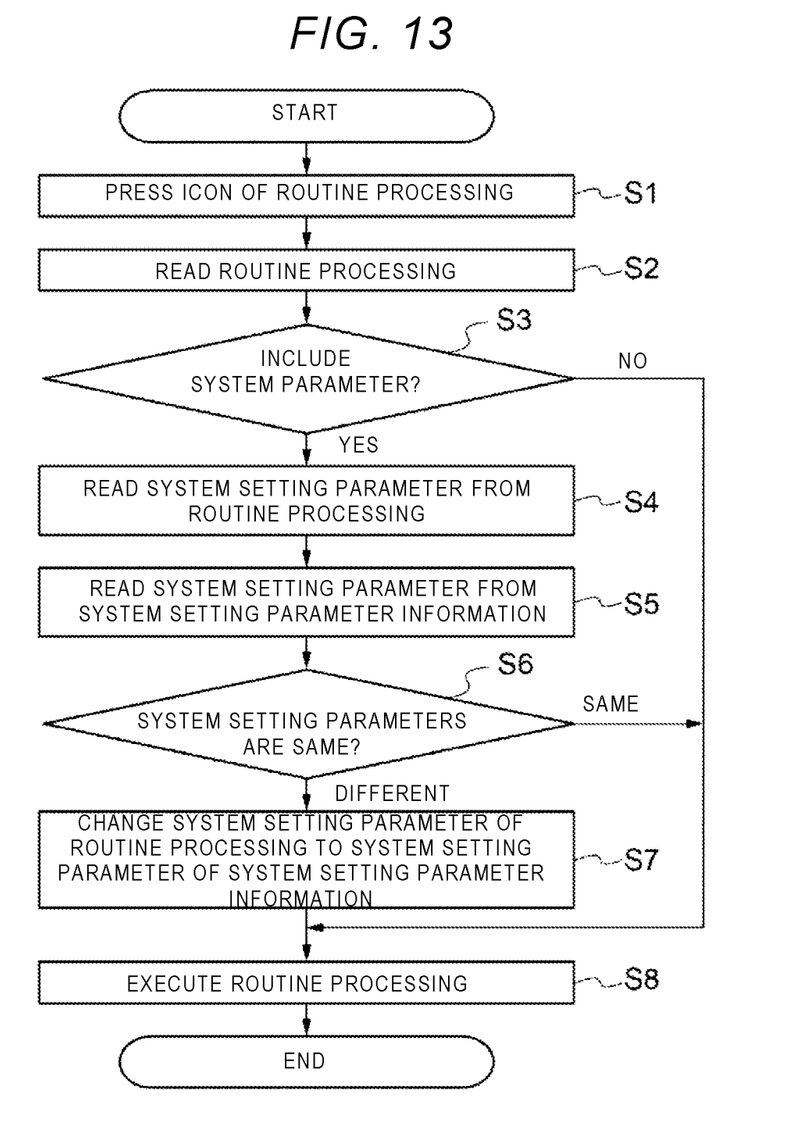
FIG. 13 is a flowchart of an operation of the image processing system according to the exemplary embodiment.

FIG. 13 is a flowchart showing an operation of the image processing system GS according to the exemplary embodiment. Hereinafter, an operation of the routine processing device TS according to the exemplary embodiment will be described with reference to the flowchart of FIG. 13.

For facilitating explanation and understanding, it is assumed that the user "C" (shown in FIG. 9) of the image processing system GS attempts to store the color photograph SY (shown in FIG. 12) in the management server KS.

Further, it is assumed that the routine processing ID "0002" (shown in FIG. 6) is registered before Sep. 2, 2019.

Moreover, it is assumed that the system setting parameter (shown in FIG. 10) of the system setting ID "123001" in the system setting parameter information SJ stored in the second storage medium 5 (shown in FIG. 2) for the administrator of the image processing system GS is the "first authentication information" before Sep. 2, 2019, and is changed to the "second authentication information" after Sep. 2, 2019.

Step S1: the CPU 2 (shown in FIG. 2) of the routine processing device TS (shown in FIG. 1) displays the home screen HG (shown in FIG. 5) on the output unit 3 which is, for example, the liquid crystal monitor, in order to receive a selection of an icon by the user "C". When the home screen HG is displayed, the user "C" presses the icon AK2 among the icons AK1 to AK3 on the home screen HG.

Step S2: when the icon AK2 is pressed in step S1, in the routine processing device TS, the CPU 2 (shown in FIG. 2) serves as the reading unit 10 (shown in FIG. 11), and reads the routine processing ID "0002" corresponding to the icon ID "2345" of the icon AK2 by referring to the icon information AJ (shown in FIG. 4) stored in the first storage medium 4 (shown in FIG. 2).

Step S3: when the routine processing ID "0002" is read in step S2, the CPU 2 serves as the determining unit 11 (shown in FIG. 11), and determines whether the routine processing ID "0002" includes the system parameter by referring to the routine processing information TJ (shown in FIG. 6) stored in the first storage medium 4. Since the routine processing ID "0002" includes the system parameter as shown in FIG. 6, the CPU 2 proceeds to "Yes".

Step S4: if it is determined in step S3 that the routine processing ID "0002" includes the system parameter, the CPU 2 serves as the reading unit 10, and reads the system parameter, that is, reads the system setting parameter "first authentication information" that is the content of the system setting ID "123001" from the routine processing information TJ stored in the first storage medium 4.

Step S5: when the system setting parameter "first authentication information" that is the content of the system setting ID "123001" is read in step S4, the CPU 2 serves as the reading unit 10, and reads the system setting parameter, that is, reads the system setting parameter "second authentication information" from the system setting parameter information SJ (shown in FIG. 10) stored in the second storage medium 5 (shown in FIG. 2).

Step S6: when the system setting parameter "second authentication information" is read from the system setting parameter information SJ of the second storage medium 5 in step S5, the CPU 2 serves as the determining unit 11, and determines whether (i) the system setting parameter "first authentication information" read from the routine processing information TJ that is stored in the first storage medium 4 for a user in step S4 and (ii) the system setting parameter "second authentication information" read from the system setting parameter information SJ that is stored in the second storage medium 5 for the administrator in step S5 are the same or different. Here, since the two system setting parameters are different, the CPU 2 proceeds to "different".

Step S7: if it is determined in step S6 that the two system setting parameters are different, the CPU 2 serves as the changing unit 12, and changes the system setting parameter "first authentication information" of the routine processing ID "0002" read in step S4 to the system setting parameter "second authentication information" in the system setting parameter information SJ read in step S5.

Step S8: when the read system setting parameter of the routine processing ID "0002" is changed from the "first authentication information" to the "second authentication information" in step S7, the CPU 2 serves as the executing unit 13 (shown in FIG. 11), and executes the routine processing of the routine processing ID "0002" whose system setting parameter is the "second authentication information".

More specifically, since the user ID "C" and the password "h7j8k9" that are input from the input unit 1 (shown in FIG. 2) by the user at the start of the operation match the user ID "C" and the password "h7j8k9" (shown in FIG. 9) that are registered in advance in the second authentication information NJ2 stored in the second storage medium 5, the CPU 2 permits login of the user "C" who attempts to use the routine processing device TS. Further, as the routine processing that is executed when the user "C" who is permitted to log in presses the icon AK2, the CPU 2 is enabled to access the management server KS (shown in FIG. 1) by authenticating using the user ID "C" and the password "h7j8k9" registered in the second authentication information NJ2, and stores the color photograph SY (shown in FIG. 10) taken from the input unit 1 (for example, a scanner) of the routine processing device TS in the storage medium in the management server KS via the network NW (shown in FIG. 1).

<Modification>

When the system setting parameter "first authentication information" of the routine processing ID "0002" read from the routine processing information TJ stored in the first storage medium 4 for a user and the system setting parameter "second authentication information" read from the system setting parameter information SJ stored in the second storage medium 5 for the administrator are different in the step S6, the following processing may be executed.

The CPU 2 displays, on the output unit 3 (for example, the liquid crystal monitor), a question such as "How do you want to execute the processing after step S6?" to the user "C". Next, the CPU 2 may receive, via the input unit 1 (for example, the keyboard), a measure that is an answer of the user "C", and execute the received measure.

When asking the user "C" the above-described question, the CPU 2 displays on the output unit 3 plural options, for example, "execute the routine processing directly", "do not execute the routine processing", and "change the system setting parameter of the routine processing and then execute the routine processing", and then may receive one of the plural options and execute the received measure.

In the above-described step S7, the CPU 2 may change the system setting parameter of the system setting parameter information SJ stored in the second storage medium 5 for the administrator from the "second authentication information" to the "first authentication information" instead of changing the read system setting parameter of the routine processing ID "0002" from the "first authentication information" to the "second authentication information".

More precisely, the CPU 2 may execute the routine processing ID "0002" including the system setting parameter "first authentication information" after changing the system setting parameter of the system setting parameter information SJ from the "second authentication information" to the "first authentication information". In this case, the CPU 2 may return the system setting parameter of the system setting parameter information SJ from the "first authentication information" to the "second authentication information" at the latest before executing other routine processing (for example, the routine processing "0003" (shown in FIG. 6)) in which the system setting parameter "second authentication information" is set.

<Supplementary Description of Processor and Program>

In the exemplary embodiment above, the term "processor" refers to hardware in a broad sense. Examples of the processor include general-purpose processors (for example, Central Processing Unit (CPU)), dedicated processors (for example, Graphics Processing Unit (GPU), Application Specific Integrated Circuit (ASIC), Field Programmable Gate Array (FPGA), and programmable logic device).

In the exemplary embodiment above, the operations of the "processor" may be implemented by a single processor or by plural processors working cooperatively. The order of operations of the processor is not limited to the order described in the exemplary embodiments above, and may be changed.

In the above-described exemplary embodiment, instead of being stored (installed) in advance in the second storage medium 5, the program PR may be provided in a manner that the program PR is recorded in a recording medium such as a compact disc read only memory (CD-ROM), a digital versatile disc read only memory (DVD-ROM), and a universal serial bus (USB) memory, or may be downloaded from an external device via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A routine processing device comprising:
a processor, wherein
in routine processing, an application parameter that defines an operation of an application and a system parameter that defines an operation of a system that is an environment where the application is executed are registered, and
the processor is configured to, if the system parameter at a time of the registration and a system parameter set in the system at a time when the routine processing is to be executed do not match, change the system parameter at the time of the registration in the routine processing to the system parameter set in the system at the time when the routine processing is to be executed, wherein the processor returns
the system parameter set in the system at the time when the routine processing is to be executed after being changed to the system parameter at the time of the registration in the routine processing
to the system parameter set in the system at the time when the routine processing is to be executed before being changed to the system parameter at the time of the registration in the routine processing,
before start of execution of other routine processing in which the system parameter at the time of the registration in the routine processing is registered.

2. The routine processing device according to claim 1, wherein
if the system parameter at the time of the registration in the routine processing and the system parameter set in the system at the time when the routine processing is to be executed do not match, the processor receives a measure for addressing the mismatch from a user, and executes the received measure.

3. The routine processing device according to claim 2, wherein the measure is to change the system parameter at the time of the registration in the routine processing and then execute the routine processing.

4. The routine processing device according to claim 2, wherein the measure is to execute the routine processing without changing the system parameter at the time of the registration in the routine processing.

5. The routine processing device according to claim 2, wherein the measure is not to execute the routine processing.

6. The routine processing device according to claim 1, wherein instead of changing the system parameter at the time of the registration in the routine processing to the system parameter set in the system at the time when the routine processing is to be executed, the processor changes the system parameter set in the system at the time when the routine processing is to be executed to the system parameter at the time of the registration in the routine processing.

7. A non-transitory computer readable medium storing a program that causes a computer to execute information processing, wherein
in routine processing, an application parameter that defines an operation of an application and a system parameter that defines an operation of a system that is an environment where the application is executed are registered,
the information processing comprising:
if the system parameter at a time of the registration and a system parameter set in the system at a time when the routine processing is to be executed do not match, change the system parameter at the time of the registration in the routine processing to the system parameter set in the system at the time when the routine processing is to be executed, and
returning
the system parameter set in the system at the time when the routine processing is to be executed after being changed to the system parameter at the time of the registration in the routine processing
to the system parameter set in the system at the time when the routine processing is to be executed before being changed to the system parameter at the time of the registration in the routine processing,
before start of execution of other routine processing in which the system parameter at the time of the registration in the routine processing is registered.

8. A routine processing device, wherein
in routine processing, an application parameter that defines an operation of an application and a system parameter that defines an operation of a system that is an environment where the application is executed are registered,
the routine processing device comprising:
means for, if the system parameter at a time of the registration and a system parameter set in the system at a time when the routine processing is to be executed do not match, changing the system parameter at the time of the registration in the routine processing to the system parameter set in the system at the time when the routine processing is to be executed, wherein the means returns
the system parameter set in the system at the time when the routine processing is to be executed after being changed to the system parameter at the time of the registration in the routine processing
to the system parameter set in the system at the time when the routine processing is to be executed before being changed to the system parameter at the time of the registration in the routine processing,
before start of execution of other routine processing in which the system parameter at the time of the registration in the routine processing is registered.

* * * * *